US011419100B2

(12) United States Patent
Zhang et al.

(10) Patent No.: US 11,419,100 B2
(45) Date of Patent: Aug. 16, 2022

(54) INFORMATION TRANSMISSION METHOD, TERMINAL DEVICE, AND ACCESS NETWORK DEVICE

(71) Applicant: HUAWEI TECHNOLOGIES CO., LTD., Guangdong (CN)

(72) Inventors: Xingwei Zhang, Lund (SE); Shulan Feng, Beijing (CN); Guanglong Du, Beijing (CN); Chao Li, Beijing (CN); Jie Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/983,705

(22) Filed: Aug. 3, 2020

(65) Prior Publication Data

US 2020/0367235 A1 Nov. 19, 2020

Related U.S. Application Data

(63) Continuation of application No. 16/503,022, filed on Jul. 3, 2019, now Pat. No. 10,764,875, which is a (Continued)

(30) Foreign Application Priority Data

Jan. 6, 2017 (CN) .......................... 201710011443.4

(51) Int. Cl.
*H04W 72/04* (2009.01)
*H04B 7/06* (2006.01)
(Continued)

(52) U.S. Cl.
CPC ........ *H04W 72/0413* (2013.01); *H04B 7/063* (2013.01); *H04B 7/0617* (2013.01);
(Continued)

(58) Field of Classification Search
CPC .... H04B 7/063; H04B 7/0617; H04B 7/0632; H04B 7/06; H04L 5/0055; H04L 5/0057;
(Continued)

(56) References Cited

U.S. PATENT DOCUMENTS 8,958,379 B2 * 2/2015 He ..................... H04W 72/1205
370/344
9,030,970 B2 * 5/2015 Lee ....................... H04L 1/0057
370/278
(Continued)

FOREIGN PATENT DOCUMENTS

CN 103427961 A 12/2013
CN 105075149 A 11/2015
(Continued)

OTHER PUBLICATIONS

Extended European Search Report issued in European Application No. 18736430.2 dated Dec. 3, 2019, 7 pages.
(Continued)

*Primary Examiner* — Man U Phan
(74) *Attorney, Agent, or Firm* — Fish & Richardson P.C.

(57) ABSTRACT

Example information transmission methods, and apparatus are described. One example information transmission method includes determining resources for carrying N pieces of uplink control information (UCI) that partly overlap or completely overlap in time domain. The N pieces of UCI comprise at least one piece of beam channel quality information and at least one of a piece of channel state information or an acknowledgement (ACK)/a negative acknowledgement (NACK). A priority of the beam channel quality information is higher than a priority of the channel state information. A priority of the beam channel quality information is lower than a priority of the ACK/NACK.

16 Claims, 7 Drawing Sheets

Related U.S. Application Data continuation of application No. PCT/CN2018/071567, filed on Jan. 5, 2018.

(51) Int. Cl.
*H04L 5/00* (2006.01)
*H04W 28/02* (2009.01)

(52) U.S. Cl.
CPC ......... *H04B 7/0632* (2013.01); *H04L 5/0055* (2013.01); *H04W 28/0278* (2013.01); *H04W 72/046* (2013.01)

(58) Field of Classification Search
CPC .. H04L 5/00; H04W 72/046; H04W 28/0278; H04W 72/04; H04W 28/02; H04W 72/0413; H04W 72/1284
USPC .......................................................... 370/329
See application file for complete search history.

(56) References Cited

U.S. PATENT DOCUMENTS

| | | | |
|---|---|---|---|
| 9,166,758 B2 | 10/2015 | Lee et al. | |
| 9,351,289 B2* | 5/2016 | Kim | H04L 1/1854 |
| 9,362,997 B2* | 6/2016 | Kim | H04B 7/0617 |
| 9,621,235 B2* | 4/2017 | Ko | H04B 7/0417 |
| 10,034,275 B2 | 7/2018 | Kim et al. | |
| 10,158,461 B2* | 12/2018 | Li | H04L 5/001 |
| 10,306,568 B2* | 5/2019 | Kim | H04W 52/383 |
| 10,425,142 B2* | 9/2019 | Park | H04B 7/0478 |
| 10,439,847 B2 | 10/2019 | Park et al. | |
| 10,555,286 B2 | 2/2020 | Xu et al. | |
| 10,700,758 B2* | 6/2020 | Tsai | H04B 7/0626 |
| 10,750,483 B2* | 8/2020 | Zhang | H04W 72/0413 |
| 10,892,809 B2* | 1/2021 | Li | H04B 7/0417 |
| 11,071,095 B2* | 7/2021 | Harrison | H04B 7/0623 |
| 11,129,145 B2* | 9/2021 | Noh | H04L 5/0094 |
| 11,133,852 B2* | 9/2021 | Park | H04B 7/0617 |
| 2012/0076028 A1 | 3/2012 | Ko et al. | |
| 2012/0220286 A1 | 8/2012 | Chen et al. | |
| 2012/0294268 A1 | 11/2012 | Lee et al. | |
| 2013/0102304 A1 | 4/2013 | Lee et al. | |
| 2013/0163521 A1* | 6/2013 | Lee | H04L 5/0053 370/328 |
| 2015/0036618 A1* | 2/2015 | Xu | H04L 5/0053 370/329 |
| 2015/0139169 A1* | 5/2015 | Sun | H04L 1/0026 370/329 |
| 2016/0038167 A1 | 2/2016 | Poucher | |
| 2016/0044655 A1 | 2/2016 | Park et al. | |
| 2016/0338041 A1 | 11/2016 | Li et al. | |
| 2016/0381674 A1* | 12/2016 | Kim | H04B 7/26 370/329 |
| 2017/0208610 A1 | 7/2017 | Tang et al. | |
| 2019/0199554 A1* | 6/2019 | Park | H04W 52/242 |
| 2019/0229856 A1* | 7/2019 | Sano | H04L 1/189 |
| 2019/0246363 A1* | 8/2019 | Kim | H04W 72/0413 |
| 2020/0244337 A1* | 7/2020 | Yuan | H04W 72/0466 |
| 2021/0337535 A1* | 10/2021 | Harrison | H04W 72/0413 |

FOREIGN PATENT DOCUMENTS

| | | |
|---|---|---|
| CN | 105519222 A | 4/2016 |
| CN | 106160956 A | 11/2016 |
| CN | 106301720 A | 1/2017 |
| EP | 2528245 A1 | 11/2012 |
| EP | 2874338 A1 | 5/2015 |
| KR | 20160068786 A | 6/2016 |
| RU | 2433573 C2 | 11/2011 |
| WO | 2014019178 A1 | 2/2014 |

OTHER PUBLICATIONS

Office Action issued in Chinese Application No. 201710011443.4 dated Feb. 25, 2020, 14 pages (with English translation).

PCT International Search Report and Written Opinion issued in International Application No. PCT/CN2018/071567 dated Mar. 28, 2018, 15 pages (with English translation).

Office Action issued in Chinese Application No. 201880005470.3 dated Dec. 21, 2020, 6 pages.

Office Action issued in Korean Application No. 2019-7022448 dated Aug. 27, 2020, 11 pages (with English translation).

Office Action issued in Russian Application No. 2019124816/07(048415) dated Jan. 27, 2021, 13 pages (machine translation).

Office Action issued in Chinese Application No. 202110954420.3 dated Jan. 30, 2022, 6 pages.

Qualcomm Inc., "Beamformed CSI-RS for support of FD-MIMO," 3GPP TSG-RAN WG1 #82, R1-153880, Beijing, China; Aug. 24-28, 2015, 4 pages.

* cited by examiner

INFORMATION TRANSMISSION METHOD, TERMINAL DEVICE, AND ACCESS NETWORK DEVICE

CROSS-REFERENCE TO RELATED APPLICATIONS

This application is a continuation of U.S. Pat. No. 10,764,875, filed on Jul. 3, 2019, which is a continuation of International Application No. PCT/CN2018/071567, filed on Jan. 5, 2018, which claims priority to Chinese Patent Application No. 201710011443.4, filed on Jan. 6, 2017. The disclosures of the aforementioned applications are hereby incorporated by reference in their entireties.

TECHNICAL FIELD

Embodiments of this application relate to the field of communications technologies, and in particular, to an information transmission method, a terminal device, and an access network device.

BACKGROUND

The 5th generation mobile communication (5G) new radio access technology (NR) dedicates to supporting higher system performance, and supporting different services, deployment scenarios, and frequency spectrums. The services mentioned above may be, for example, an Enhanced Mobile Broadband (eMBB) service, a machine type communication (MTC) service, an ultra-reliable and low latency communications (URLLC) service, a Multimedia Broadcast Multicast Service (MBMS), and a positioning service. The deployment scenarios mentioned above may be, for example, an indoor hotspot scenario, a dense urban scenario, a suburb scenario, an urban macro scenario, and a high-speed railway scenario. The frequency spectrum mentioned above may be, for example, any frequency range within 100 GHz.

To meet service requirements corresponding to various services, deployment scenarios, frequency spectrums, and the like in the 5G NR, types of uplink control information (UCI) need to be added to the 5G NR. This leads to that a terminal device may need to report a plurality of pieces of UCI to an access network device in a same time unit.

However, when the terminal device needs to simultaneously report a plurality of pieces of UCI to the access network device, a UCI reporting conflict is likely to occur, and the plurality of pieces of UCI may fail to be reported, affecting data transmission performance, and making it difficult to ensure service requirements.

SUMMARY

Embodiments of this application provide an information transmission method, a terminal device, and an access network device, to prevent a UCI reporting conflict, improve data transmission performance, and ensure service requirements.

According to a first aspect, an embodiment of this application further provides an information transmission method, including:

determining, by a terminal device, N pieces of uplink control information UCI that need to be sent in a same time unit, where N is an integer greater than or equal to 2, and the N pieces of UCI include at least one of the following: beamforming information, buffer status report information, and scheduling request information; and sending, by the terminal device, M pieces of UCI to an access network device based on priorities of the N pieces of UCI, where priorities of the M pieces of UCI are higher than priorities of other N-M pieces of UCI in the N pieces of UCI, and M is a positive integer less than or equal to N.

In the method, the terminal device sends the M pieces of UCI with the highest priorities to the access network device by sorting the N pieces of UCI, instead of reporting all of the N pieces of UCI to the access network device, thereby effectively preventing a UCI reporting conflict, ensuring a UCI reporting success rate, and effectively ensuring data transmission performance and service requirements.

Optionally, before the determining, by a terminal device, N pieces of uplink control information UCI that need to be sent in a same time unit, the method may further include:

receiving, by the terminal device, indication information from the access network device.

The determining, by a terminal device, N pieces of uplink control information UCI that need to be sent in a same time unit includes:

determining, by the terminal device based on the indication information, the N pieces of UCI that need to be sent in the same time unit.

Optionally, the N pieces of UCI further include CSI, and a priority of at least one piece of UCI in the beamforming information, the buffer status report information, and the scheduling request information is higher than a priority of the CSI.

The BFI, a BSR, or an SR that has a higher priority is reported and the CSI that has a lower priority is discarded to achieve the following technical effects. It is ensured that important UCI can still be reported as much as possible when a conflict occurs in reporting a plurality of pieces of UCI including the BFI/BSR/SR/CSI, and a system performance loss is minimized.

Optionally, if the N pieces of UCI include only the beamforming information and the CSI, a priority of the beamforming information may be higher than the priority of the CSI. The terminal device may send only the beamforming information to the access network device based on the priorities of the N pieces of UCI, and discard the CSI without sending the CSI.

Optionally, a sending period of the beamforming information in time domain is T preset time lengths, and a sending period of the CSI in time domain is P preset time lengths, where T≥P, and both T and P are positive integers.

Compared with the CSI, the beamforming information changes relatively slowly without a need of frequent updates, and therefore may have a longer sending period, to reduce signaling overheads.

Optionally, the N pieces of UCI further include an acknowledgement ACK/a negative acknowledgement NACK, and the priority of the at least one piece of UCI in the beamforming information, the buffer status report information, and the scheduling request information is lower than a priority of the ACK/NACK.

Optionally, before the sending, by the terminal device, M pieces of UCI to an access network device based on priorities of the N pieces of UCI, the method may further include:

determining, by the terminal device, a priority of UCI based on a subcarrier spacing SCS, where a larger SCS indicates a higher priority of corresponding UCI; or determining, by the terminal device, a priority of UCI based on a time length, where a shorter time length indicates a higher priority of corresponding UCI; or determining, by the terminal device, a priority of UCI based on a corresponding information type or service type, where a higher priority of an information type or a service type indicates a higher priority of corresponding UCI.

In the method, a larger SCS indicates a higher priority of corresponding UCI, or a shorter time length indicates a higher priority of corresponding UCI so that a priority of UCI of a low-delay service is relatively high, a priority of UCI of a delay-insensitive service is relatively low, the access network device receives the UCI of the low-delay service as much as possible, and reliability and a delay requirement of the low-delay service are effectively ensured.

Optionally, the determining, by the terminal device, a priority of UCI based on an SCS further includes:

if a same SCS is used, determining, by the terminal device, the priority of UCI based on the information type or the service type.

Optionally, the determining, by the terminal device, a priority of UCI based on a time length further includes:

if a same time length is used, determining, by the terminal device, the priority of UCI based on the information type or the service type.

Optionally, the determining, by the terminal device, a priority of UCI based on an information type or a service type may further include:

if a same information type or service type is used, determining, by the terminal device, the priority of UCI based on the SCS or the time length.

Optionally, the sending, by the terminal device, M pieces of UCI to an access network device based on priorities of the N pieces of UC may include:

sending, by the terminal device, the M pieces of UCI to the access network device through a physical uplink control channel PUCCH based on the priorities of the N pieces of UCI Optionally, the sending, by the terminal device, the M pieces of UCI to the access network device through a PUCCH based on the priorities of the N pieces of UCI includes:

if a total quantity of bits of the N pieces of UCI is greater than a maximum quantity of bits that can be carried on the PUCCH, sending, by the terminal device, the M pieces of UCI to the access network device through the PUCCH based on the priorities of the N pieces of UCI, where a total quantity of bits of the M pieces of UCI is less than or equal to the maximum quantity of bits that can be carried on the PUCCH.

In the method, when the total quantity of bits of the N pieces of UCI is greater than the maximum quantity of bits that can be carried on the PUCCH, the M pieces of UCI with the highest priorities in the N pieces of UCI may be sent to the access network device, to effectively prevent a conflict in reporting the N pieces of UCI through the PUCCH, improve a UCI reporting success rate, and effectively ensure data transmission performance and service requirements.

According to a second aspect, an embodiment of this application may further provide an information transmission method, including:

sending, by an access network device, indication information to a terminal device, where the indication information is used to indicate time unit information of N pieces of uplink control information UCI to the terminal device, the time unit information is used to determine the N pieces of UCI that need to be carried in a time unit, N is an integer greater than or equal to 2, and the N pieces of UC include at least one of the following: beamforming information, buffer status report information, and scheduling request information; and receiving, by the access network device, M pieces of UCI in the N pieces of UCI from the terminal device, where priorities of the M pieces of UCI are higher than priorities of other N−M pieces of UCI in the N pieces of UCI, and M is a positive integer less than N.

Optionally, the N pieces of UCI further include channel state information CSI, and a priority of at least one piece of UCI in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and T and P are positive integers.

Optionally, the N pieces of UCI further include an acknowledgement ACK/a negative acknowledgement NACK, and the priority of the at least one piece of UCI in the beamforming information, the buffer status report information, and the scheduling request information is lower than a priority of the ACK/NACK.

Optionally, a priority of UCI is determined by the access network device based on a subcarrier spacing SCS, and a larger SCS indicates a higher priority of corresponding UCI; or a priority of UCI is determined by the access network device based on a time length, and a shorter time length indicates a higher priority of corresponding UCI; or a priority of UCI is determined by the access network device based on a priority of an information type or a service type, and a higher priority of an information type or a service type indicates a higher priority of corresponding UCI.

Optionally, if the priority of UCI is determined by the access network device based on the SCS, and a same SCS is used, the priority of UCI is determined by the access network device based on the information type or the service type.

Optionally, if the priority of UCI is determined by the access network device based on the time length, and a same time length is used, the priority of UCI is determined by the access network device based on the information type or the service type.

Optionally, if the priority of UCI is determined by the access network device based on the information type or the service type, and a same information type or service type is used, the priority of UCI is determined by the access network device based on the SCS or the time length.

Optionally, the receiving, by the access network device, M pieces of UCI from the terminal device may include:

receiving, by the access network device, the M pieces of UCI through a physical uplink control channel PUCCH.

Optionally, the receiving, by the access network device, the M pieces of UCI through a PUCCH includes:

receiving, by the access network device through the PUCCH, the M pieces of UCI that are sent by the terminal device when a total quantity of bits of the N pieces of UCI is greater than a maximum quantity of bits that can be carried on the PUCCH, where a total quantity of bits of the M pieces of UCI is less than or equal to the maximum quantity of bits that can be carried on the PUCCH.

Optionally, the method may further include:

determining, by the access network device, historical parameters that correspond to the N-M pieces of UCI and that are closest to a current time.

Optionally, to ensure that the access network device receives, as much as possible, the UCI sent by the terminal device, M may be the maximum quantity of pieces of UCI that can be carried on the PUCCH.

After receiving the M pieces of UCI from the terminal device, the access network device further determines the historical parameters that correspond to the N-M pieces of UCI and that are closest to the current time, and then uses the historical parameters that correspond to the N-M pieces of UCI, to prevent a UCI reporting conflict, improve a UCI reporting success rate, and further effectively ensure service requirements when the access network device receives a relatively small quantity of pieces of UCI. The historical parameters that correspond to the N-M pieces of UCI and that are closest to the current time are used, to ensure the service requirements of the terminal device.

According to a third aspect, an embodiment of this application may further provide a terminal device, including:

a processing module, configured to determine N pieces of uplink control information UCI that need to be sent in a same time unit, where N is an integer greater than or equal to 2, and the N pieces of UCI include at least one of the following: beamforming information, buffer status report information, and scheduling request information; and a sending module, configured to send M pieces of UCI to an access network device based on priorities of the N pieces of UCI, where priorities of the M pieces of UCI are higher than priorities of other N-M pieces of UCI in the N pieces of UCI, and M is a positive integer less than or equal to N.

Optionally, the terminal device may further include:

a receiving module, configured to receive indication information sent by the access network device; where the processing module is further configured to determine, based on the indication information, the N pieces of UCI that need to be sent in a same time unit.

Optionally, the N pieces of UCI further include channel state information CSI, and a priority of at least one piece of UCI in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and both T and P are positive integers.

Optionally, the N pieces of UCI further include an acknowledgement ACK/a negative acknowledgement NACK, and the priority of the at least one piece of UCI in the beamforming information, the buffer status report information, and the scheduling request information is lower than a priority of the ACK/NACK.

Optionally, the processing module is further configured to determine a priority of UCI based on a subcarrier spacing SCS, where a larger SCS indicates a higher priority of corresponding UCI; or determine a priority of UCI based on a time length, where a shorter time length indicates a higher priority of corresponding UCI; or determine a priority of UCI based on an information type or a service type, where a higher priority of an information type or a service type indicates a higher priority of corresponding UCI.

Optionally, the processing module is further configured to determine the priority of UCI based on the SCS, and if a same SCS is used, determine the priority of UCI based on the information type or the service type.

Optionally, the processing module is further configured to determine the priority of UCI based on the time length, and if a same time length is used, determine the priority of UCI based on the information type or the service type.

Optionally, the processing module is further configured to determine the priority of UCI based on the information type or the service type, and if a same information type or service type is used, determine the priority of UCI based on the SCS or the time length.

Optionally, the sending module is further configured to send the M pieces of UCI to the access network device through a physical uplink control channel PUCCH based on the priorities of the N pieces of UCI.

Optionally, the sending module is further configured to: if a total quantity of bits of the N pieces of UCI is greater than a maximum quantity of bits that can be carried on the PUCCH, send the M pieces of UCI to the access network device through the PUCCH based on the priorities of the N pieces of UCI, where a total quantity of bits of the M pieces of UCI is less than or equal to the maximum quantity of bits that can be carried on the PUCCH.

According to a fourth aspect, an embodiment of this application further provides an access network device, including:

a sending module, configured to send indication information to a terminal device, where the indication information is used to indicate time unit information of N pieces of uplink control information UCI to the terminal device, the time unit information is used to determine the N pieces of UCI that need to be carried in a time unit, N is an integer greater than or equal to 2, and the N pieces of UCI include at least one of the following: beamforming information, buffer status report information, and scheduling request information; and a receiving module, configured to receive M pieces of UCI from the terminal device, where priorities of the M pieces of UCI are higher than priorities of other N-M pieces of UCI in the N pieces of UCI, and M is a positive integer less than or equal to N.

Optionally, the N pieces of UCI further include channel state information CSI, and a priority of at least one piece of UCI in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and T and P are positive integers.

Optionally, the N pieces of UCI further include an acknowledgement ACK/a negative acknowledgement NACK, and the priority of the at least one piece of UCI in the beamforming information, the buffer status report information, and the scheduling request information is lower than a priority of the ACK/NACK.

Optionally, a priority of UCI is determined by the access network device based on a subcarrier spacing SCS, and a larger SCS indicates a higher priority of corresponding UCI; or a priority of UCI is determined by the access network device based on a time length, and a shorter time length indicates a higher priority of corresponding UCI; or a priority of UCI is determined by the access network device based on an information type or a service type, and a higher priority of an information type or a service type indicates a higher priority of corresponding UCI.

Optionally, if the priority of UCI is determined by the access network device based on the SCS, and a same SCS is used, the priority of UCI is determined by the access network device based on the information type or the service type.

Optionally, if the priority of UCI is determined by the access network device based on the time length, and a same time length is used, the priority of UCI is determined by the access network device based on the information type or the service type.

Optionally, if the priority of UCI is determined by the access network device based on the information type or the service type, and a same information type or service type is used, the priority of UCI is determined by the access network device based on the SCS or the time length.

Optionally, the receiving module is further configured to receive the M pieces of UCI through a physical uplink control channel PUCCH.

Optionally, the receiving module is further configured to receive, through the PUCCH, the M pieces of UCI that are sent by the terminal device when a total quantity of bits of the N pieces of UCI is greater than a maximum quantity of bits that can be carried on the PUCCH, where a total quantity of bits of the M pieces of UCI is less than or equal to the maximum quantity of bits that can be carried on the PUCCH.

Optionally, the access network device further includes:

a processing module, configured to determine historical parameters that correspond to the N-M pieces of UCI and that are closest to a current time.

According to a fifth aspect, an embodiment of this application may further provide a terminal device, including: a processor and a transmitter, and the processor is connected to the transmitter, where the processor is configured to determine N pieces of uplink control information UCI that need to be sent in a same time unit, where N is an integer greater than or equal to 2, and the N pieces of UCI include at least one of the following: beamforming information, buffer status report information, and scheduling request information; and the transmitter is configured to send M pieces of UCI to an access network device based on priorities of the N pieces of UCI, where priorities of the M pieces of UCI are higher than priorities of other N-M pieces of UCI in the N pieces of UCI, and M is a positive integer less than or equal to N.

Optionally, the terminal device may further include a receiver, and the receiver may be connected to the processor, where the receiver is configured to receive indication information sent by the access network device; and the processor is further configured to determine, based on the indication information, the N pieces of UCI that need to be sent in a same time unit.

Optionally, the N pieces of UCI further include channel state information CSI, and a priority of at least one piece of UC in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and both T and P are positive integers.

Optionally, the N pieces of UCI further include an acknowledgement ACK/a negative acknowledgement NACK, and the priority of the at least one piece of UCI in the beamforming information, the buffer status report information, and the scheduling request information is lower than a priority of the ACK/NACK.

Optionally, the processor is further configured to determine a priority of UCI based on a subcarrier spacing SCS, where a larger SCS indicates a higher priority of corresponding UCI; or determine a priority of UCI based on a time length, where a shorter time length indicates a higher priority of corresponding UCI; or determine a priority of UCI based on an information type or a service type, where a higher priority of an information type or a service type indicates a higher priority of corresponding UCI.

Optionally, the processor is further configured to determine the priority of UCI based on the SCS, and if a same SCS is used, determine the priority of UCI based on the information type or the service type.

Optionally, the processor is further configured to determine the priority of UCI based on the time length, and if a same time length is used, determine the priority of UCI based on the information type or the service type.

Optionally, the processor is further configured to determine the priority of UCI based on the information type or the service type, and if a same information type or service type is used, determine the priority of UCI based on the SCS or the time length.

Optionally, the transmitter is further configured to send the M pieces of UCI to the access network device through a physical uplink control channel PUCCH based on the priorities of the N pieces of UCI.

Optionally, the transmitter is further configured to: if a total quantity of bits of the N pieces of UCI is greater than a maximum quantity of bits that can be carried on the PUCCH, send the M pieces of UCI to the access network device through the PUCCH based on the priorities of the N pieces of UCI, where a total quantity of bits of the M pieces of UCI is less than or equal to the maximum quantity of bits that can be carried on the PUCCH.

According to a sixth aspect, an embodiment of this application further provides an access network device, including: a transmitter and a receiver, where the transmitter is configured to send indication information to a terminal device, where the indication information is used to indicate time unit information of N pieces of uplink control information UCI to the terminal device, the time unit information is used to determine the N pieces of UCI that need to be carried in a time unit, N is an integer greater than or equal to 2, and the N pieces of UCI include at least one of the following: beamforming information, buffer status report information, and scheduling request information; and the receiver is configured to receive M pieces of UCI from the terminal device, where priorities of the M pieces of UCI are higher than priorities of other N–M pieces of UCI in the N pieces of UCI, and M is a positive integer less than or equal to N.

Optionally, the N pieces of UCI further include channel state information CSI, and a priority of at least one piece of UCI in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and T and P are positive integers.

Optionally, the N pieces of UCI further include an acknowledgement ACK/a negative acknowledgement NACK, and the priority of the at least one piece of UCI in the beamforming information, the buffer status report information, and the scheduling request information is lower than a priority of the ACK/NACK.

Optionally, a priority of UCI is determined by the access network device based on a subcarrier spacing SCS, and a larger SCS indicates a higher priority of corresponding UCI; or a priority of UCI is determined by the access network device based on a time length, and a shorter time length indicates a higher priority of corresponding UCI; or a priority of UCI is determined by the access network device based on an information type or a service type, and a higher priority of an information type or a service type indicates a higher priority of corresponding UCI.

Optionally, if the priority of UCI is determined by the access network device based on the SCS, and a same SCS is used, the priority of UCI is determined by the access network device based on the information type or the service type.

Optionally, if the priority of UCI is determined by the access network device based on the time length, and a same time length is used, the priority of UCI is determined by the access network device based on the information type or the service type.

Optionally, if the priority of UCI is determined by the access network device based on the information type or the service type, and a same information type or service type is used, the priority of UCI is determined by the access network device based on the SCS or the time length.

Optionally, the receiver is further configured to receive the M pieces of UCI through a physical uplink control channel PUCCH.

Optionally, the receiver is further configured to receive, through the PUCCH, the M pieces of UCI that are sent by the terminal device when a total quantity of bits of the N pieces of UCI is greater than a maximum quantity of bits that can be carried on the PUCCH, where a total quantity of bits of the M pieces of UCI is less than or equal to the maximum quantity of bits that can be carried on the PUCCH.

Optionally, the access network device further includes:

a processor, configured to determine historical parameters that correspond to the N-M pieces of UCI and that are closest to the current time.

According to a seventh aspect, an embodiment of this application further provides a computer program product. The computer program product includes corresponding program code that is used to perform any information transmission method provided in the first aspect of the embodiments of this application.

According to an eighth aspect, an embodiment of this application further provides a computer program product. The computer program product includes corresponding program code that is used to perform any information transmission method provided in the second aspect of the embodiments of this application.

According to a ninth aspect, an embodiment of this application further provides a storage medium. The storage medium is configured to store a computer program product. The computer program product includes program code. The program code may include corresponding program code that is used to perform any information transmission method provided in the first aspect of the embodiments of this application.

According to a tenth aspect, an embodiment of this application further provides a storage medium. The storage medium is configured to store a computer program product. The computer program product includes program code. The program code may include corresponding program code that is used to perform any information transmission method provided in the second aspect of the embodiments of this application.

According to the information transmission method, the terminal device, and the access network device provided in the embodiments of this application, the terminal device determines the N pieces of UCI that need to be sent in the same time unit, and sends the M pieces of UCI with the highest priorities in the N pieces of UCI to the access network device based on the priorities of the N pieces of UCI. In the method, the terminal device sends the M pieces of UCI with the highest priorities to the access network device by sorting the N pieces of UCI, instead of reporting all of the N pieces of UCI to the access network device, thereby effectively preventing a UCI reporting conflict, ensuring a UCI reporting success rate, and effectively ensuring data transmission performance and service requirements.

DESCRIPTION OF EMBODIMENTS

An information transmission method, a terminal device, and an access network device provided in the following embodiments of this application may be applicable to 5G NR communications technologies or evolved communications technologies of any other communications technologies.

Figure 1:
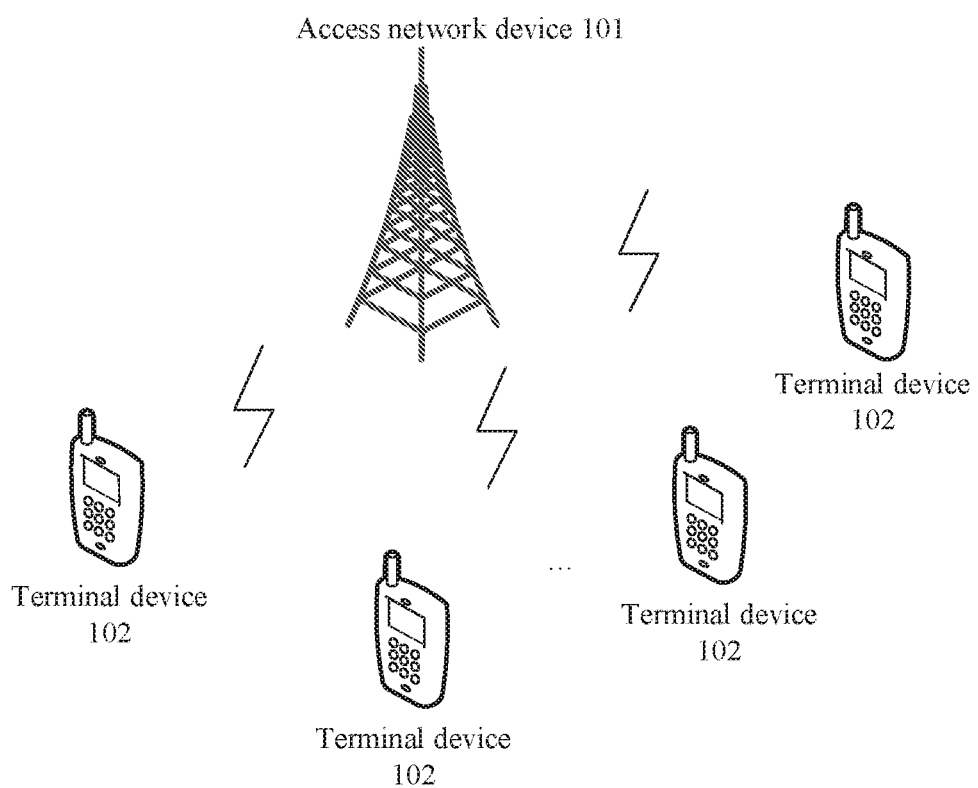
FIG. 1 is an architectural diagram of a communications system applicable to embodiments of this application.

FIG. 1 is an architectural diagram of a communications system applicable to the embodiments of this application. Methods provided in the following embodiments of this application may be applied to the communications system shown in FIG. 1. As shown in FIG. 1, the communications system includes at least one access network device 101.

Each access network device 101 serves at least one terminal device 102 through a radio interface.

It should be noted that both a quantity of the access network devices 101 included in the communications system shown in FIG. 1 and a quantity of the terminal devices 102 served by the access network device 101 are configured according to an actual network requirement. This is not specifically limited in this application.

In FIG. 1, one access network device 101 and the terminal devices 102 served by the access network device 101 are shown merely as an example. The content shown in FIG. 1 is not intended to specifically limit the quantity of the access network devices 101 included in the communications system and the quantity of the terminal devices 102 served by the access network device 101.

The terminal device 102 shown in FIG. 1 may be a device providing data connectivity for a user, a handheld device having a wireless connection function, or a wireless device connected to a wireless modem. A wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a remote station, an access point, a remote terminal, an access terminal, a user terminal, a user agent, user device, or user equipment (UE), a smartphone, an automotive device, or an Internet Of Things device (IoT Device).

The access network device 101 shown in FIG. 1 may be a form of a radio station, and is a radio transceiver station that transfers information with a mobile phone terminal in a particular radio coverage area by using a mobile communications switching center, or may be a device that communicates with a wireless terminal over an air interface in an access network by using one or more sectors. The access network device may be configured to perform mutual conversion between a received over-the-air frame and an Internet Protocol (IP) packet, and serve as a router between the wireless terminal and a remaining part of the access network. The remaining part of the access network may include an Internet Protocol (IP) network. The access network device may further coordinate attribute management on the air interface. For example, the access network device may be a base station, such as any one of a base transceiver station (BTS), a NodeB, an evolved NodeB (eNB), and the like. No limitation is imposed in this application.

The following uses a plurality of examples for description.

Figure 2:
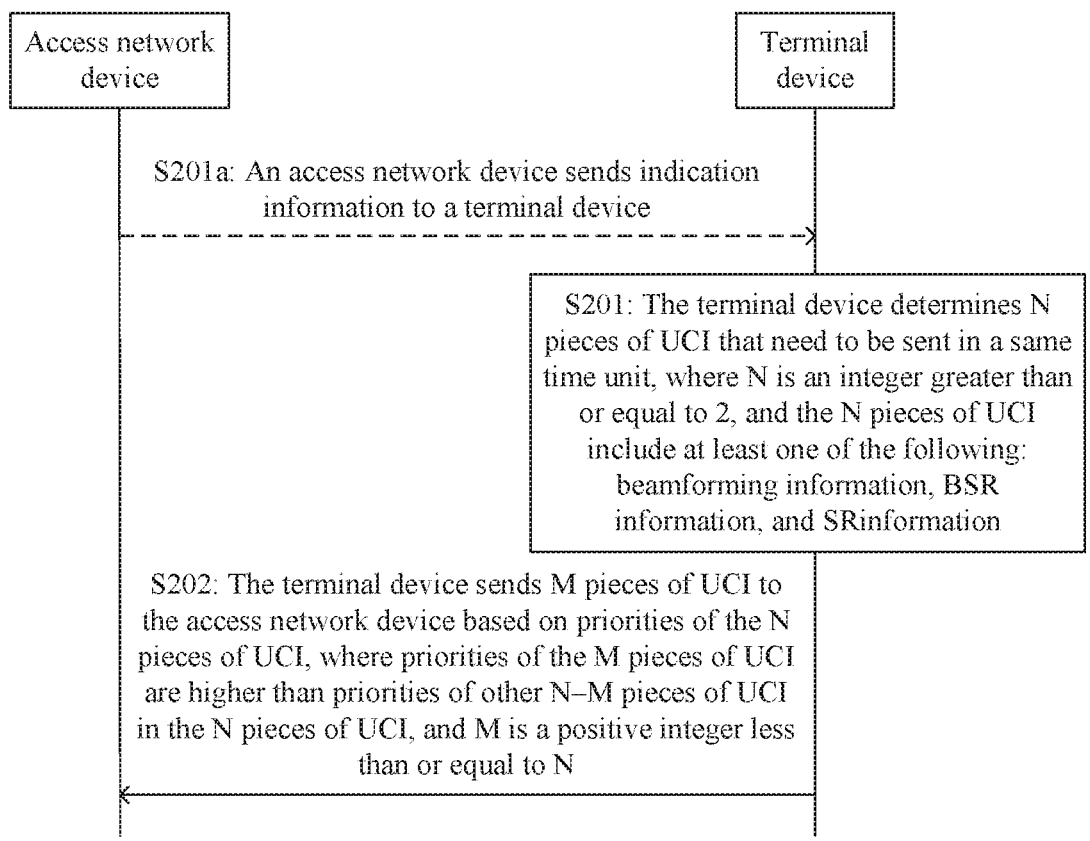
FIG. 2 is a flowchart of an information transmission method according to an embodiment of this application.

FIG. 2 is a flowchart of an information transmission method according to an embodiment of this application. As shown in FIG. 2, the method may include the following steps.

S201a: An access network device sends indication information to a terminal device.

S201a is an optional step. The access network device may send the indication information to the terminal device through a physical downlink channel, and the information may be separately sent to the terminal in a unicast manner, or may be sent to the terminal in a broadcast manner. The physical downlink channel may include, for example, at least one of the following: a physical downlink control channel (PDCCH), a physical downlink shared channel (PDSCH), a physical control format indicator channel (PCFICH), a physical hybrid automatic repeat request indicator channel (PHICH), a physical broadcast channel (PBCH), a physical multicast channel (PMCH), and the like.

Correspondingly, the terminal device may receive the indication information from the access network device.

S201: The terminal device determines N pieces of UCI that need to be sent in a same time unit, where N is an integer greater than or equal to 2, and the N pieces of UCI include at least one of the following: beamforming information, buffer status report (BSR) information, and scheduling request (SR) information.

The beamforming information may be a beamforming indication (BFI), may be beamforming indication signaling sent through an uplink channel, may be information indicating a beam in which a downlink channel is located, or may be information indicating an antenna port. The BFI may include a beam identifier that is selected by the terminal device and used to report, to the access network device, a beam selected by the terminal device, or include information used to report to the access network device, channel quality of the beam selected by the terminal device, such as a channel quality indicator of a beam that is selected by the terminal device and. The BFI may further include an antenna port selected by the terminal device, for example, an antenna port of a downlink reference signal. The BSR information may include: information indicating an amount of uplink data to be sent by the terminal device, and the like. The SR information may include: information indicating whether the terminal device needs to send uplink data and/or information indicating an amount of to-be-sent uplink data, and the like. The information indicating an amount of to-be-sent uplink data may be represented by a quantity of bits.

Optionally, lengths of time units of resources occupied by a plurality of pieces of UCI may be the same or may be different, for example, different subcarrier spacings result in different symbol lengths, and quantities of occupied symbols may also be different. For example, a subframe includes two slots, and each slot has seven symbols. A subframe has 14 symbols, but for different UCI, different subcarrier spacings (SCS) in frequency domain result in different symbol lengths, as shown in the following Table 1. Time units of different pieces of UCI in a plurality of pieces of UCI may partially overlap, or may completely overlap. For example, a piece of UCI may be sent through a physical uplink control channel (PUCCH). A length of a subframe that carries the piece of UCI is 1 millisecond, the subframe has 14 symbols, and all of the 14 symbols are used to send the piece of UCI. A second piece of UCI is also sent through the PUCCH, a length of a subframe that carries the piece of UCI is 0.5 millisecond, the subframe also has 14 symbols, and all of the 14 symbols are used to send the piece of UCI. The two pieces of UCI are both sent by using 14 symbols. However, for the subframe having a length of 1 millisecond, a symbol length in time domain is twice that of the subframe having a length of 0.5 millisecond. If in time domain, a start location of a PUCCH of a first piece of UCI is the same as a start location of the PUCCH of the second piece of UCI, the PUCCH of the second piece of UCI overlaps the first 0.5 millisecond of the PUCCH of the first piece of UCI. The two pieces of UCI partially overlap. If in time domain, the start locations of the PUCCHs that are used to send the two pieces of UCI are the same, each PUCCH occupies 14 symbols, and symbol lengths of the two PUCCHs in time domain are the same, the two pieces of UCI completely overlap in time domain.

A time unit of a resource occupied by a piece of UCI may be at least one radio frame, at least one subframe, at least one slot, at least one symbol, or the like.

In addition, a PUCCH that is used to send a piece of UCI may not have 14 symbols. For example, a PUCCH that is used to send UCI occupies one or two symbols in time domain. This also leads to that two pieces of UCI partially overlap in time domain, but do not completely overlap.

The terminal device may further determine, based on preset time unit information of a plurality of pieces of UCI, N pieces of UCI whose time units partially overlap or completely overlap in the plurality of pieces of to-be-sent UCI as N pieces of UCI that need to be sent in a same time unit. To be specific, the terminal device determines a sending moment based on a timing relationship, for example, a base station sends downlink information in a subframe D, and UE determines the sending moment as D+k based on the timing relationship. The preset time unit information of the plurality of pieces of UCI is preset on the terminal device side, and the N pieces of UCI that need to be sent in the same time unit are determined. The time unit information of the plurality of pieces of UC may include: preset scheduled sending information, trigger information, and the like of each piece of UCI in the plurality of pieces of UCI.

To be specific, in S201, the terminal device may further determine, based on the indication information, time unit information that carries a plurality of pieces of UCI, and determine, based on the time unit information that carries the plurality of pieces of UCI, N pieces of UCI whose time units partially overlap or completely overlap in the plurality of pieces of UCI as N pieces of UCI that need to be sent in a same time unit. The same time unit may include at least one radio frame, at least one subframe, at least one slot, at least one symbol, or the like. The terminal device may separately send M pieces of UCI to the access network device based on a time-frequency resource of each piece of UCI in the M pieces of UCI.

The indication information may include: information such as a sending period and/or a time offset of each piece of UCI configured by the access device network for the terminal device. For example, the terminal device separately receives sending periods and time offsets of a rank indicator (RI) and a precoding matrix indicator (PMI)/channel quality indicator (CQI) configured by the access network device. The terminal device may determine, based on the configured sending periods and time offsets, time units carrying the RI and the PMI/CQI. The terminal device sends the RI in the time unit carrying the RI, and the terminal device sends the PMI/CQI in the time unit carrying the PMI/CQI.

S202: The terminal device sends M pieces of UCI to the access network device based on priorities of the N pieces of UCI, where priorities of the M pieces of UCI are higher than priorities of other N-M pieces of UCI in the N pieces of UCI, and M is a positive integer less than or equal to N.

The terminal device may determine the priorities of the N pieces of UCI based on a preset priority rule, and determine the M pieces of UCI with the highest priorities in the N pieces of UCI. Then, the terminal device sends the M pieces of UCI to the access network device, and discards N-M pieces of UCI with the lowest priorities in the N pieces of UCI without sending them to the access network device. The priorities of the M pieces of UCI are higher than the priorities of other N-M pieces of UCI in the N pieces of UCI.

Optionally, the terminal device may separately send each piece of UCI in the M pieces of UCI to the access network device in a time unit carrying each piece of UCI in the M pieces of UCI.

Optionally, the terminal device may send the M pieces of UCI in the time unit to the access network device based on the priorities of the N pieces of UCI. The time unit may be an overlapping part of time units carrying the M pieces of UCI in time domain.

Correspondingly, the access network device receives the M pieces of UCI from the terminal device.

Optionally, M is less than N. The terminal device determines the N pieces of UCI that need to be sent in a same time unit, and sends the M pieces of UCI with the highest priorities in the N pieces of UCI to the access network device based on the priorities of the N pieces of UCI. In the method, the terminal device sends the M pieces of UCI with the highest priorities to the access network device by sorting the N pieces of UCI, instead of reporting all of the N pieces of UCI to the access network device, thereby effectively preventing a UCI reporting conflict, ensuring a UCI reporting success rate, and effectively ensuring data transmission performance and service requirements.

Optionally, the N pieces of UCI may further include channel state information (CSI). A priority of at least one piece of UCI in the beamforming information, the BSR information, and the SR information may be higher than a priority of the CSI.

Optionally, if the N pieces of UCI include only the beamforming information and the CSI, a priority of the beamforming information may be higher than the priority of the CSI. The terminal device may send only the beamforming information to the access network device based on the priorities of the N pieces of UCI, and discard the CS without sending the CSI.

According to the method in this embodiment of this application, the priority of the beamforming information is higher than the priority of the CSI, so that the access network device may receive the beamforming information in a timely manner, thereby effectively preventing a relatively long wait time for receiving the beamforming information again by the access network device, and effectively ensuring service requirements.

Optionally, the CSI includes at least one of the following: an RI, a PMI, a CQI, and a precoding type indicator (PTI). The CQI is used to indicate channel quality, the PMI is used to indicate a precoding matrix, the PTI is used to indicate a precoding type, and the RI is used to indicate a rank of a channel matrix.

The PMI may include: a wideband (WB) PMI and/or a subband (SB) PMI. The CQI may include: a WB CQI and/or an SB CQI.

Optionally, a sending period of the beamforming information in time domain is T preset time lengths, and a sending period of the CSI in time domain is P preset time lengths, where T≥P, and both T and P are positive integers.

Optionally, T may be P times A, where A is a positive integer.

To be specific, the sending period of the beamforming information in time domain may be greater than or equal to the sending period of the CSI in time domain. Compared with the CSI, the beamforming information changes relatively slowly without a need of frequent updates, and therefore the sending period of the beamforming information may be relatively long, to reduce signaling overheads.

Optionally, the N pieces of UC may further include an acknowledgement (ACK)/a negative acknowledgement (NACK), and the priority of at least one piece of UCI in the beamforming information, the BSR information, and the SR information is lower than a priority of the ACK/NACK.

If the UCI includes several types of UCI, such as a BFI, a BSR, an SR, an RI, a WB CQI/PMI, an SB CQI/PMI, and an ACK/NACK, the terminal device may further determine the priorities of the N pieces of UCI in the following plurality of manners. The BFI indicates the beamforming information, the BSR indicates the BSR information, and the SR indicates the SR information. The CQI is used to indicate channel quality, the PMI is used to indicate a precoding matrix, the PTI is used to indicate a precoding type, and the RI is used to indicate a rank of a channel matrix. The ACK/NACK is used to feed back whether data is correctly received, the BSR is used to report a buffer status, the SR is used to send a scheduling request, and the BFI is used to report, to the base station, a beam selected by the terminal device.

Optionally, the priorities of the N pieces of UC may be represented in descending order as: BFI>ACK/NACK>SR>RI>WB CQI/PMI>SB CQI/PMI>BSR. There is different UCI for different beams, and a parameter corresponding to UCI is related to a beam. Therefore, to ensure that the access network device accurately parses out information such as a beam selected by the terminal device in a timely manner, according to the method in this embodiment of this application, a priority of the BFI may be higher than priorities of other UCI in the N pieces of UCI. In addition, the ACK/NACK determines information such as data retransmission between the access network device and the terminal device, the SR may be further retransmitted even if the SR fails to be transmitted. Transmission of the SR is more urgent compared with that of the CSI. Therefore, a priority of the SR may be lower than the priority of the ACK/NACK, but higher than the priority of the CSI. In all UCI included in the CSI, a priority of the RI may be higher than a priority of the WB CQI/PMI, and the priority of the WB CQI/PMI may be higher than a priority of the SB CQI/PMI. If the BSR is transmitted through a physical uplink shared channel (PUSCH), a priority of the PUCCH may be higher than a priority of the PUSCH, and therefore a priority of the BSR may be lower than the priority of the SB CQI/PMI.

Optionally, the priorities of the N pieces of UCI may be represented in descending order as: ACK/NACK>BFI>SR>RI>WB CQI/PMI>SB CQI/PMI>BSR. The ACK/NACK is for downlink data delivered by the access network device to the terminal device, and therefore, for the access network device, resource information such as a beam used to send the downlink data is known, and in the N pieces of UCI, the priority of the BFI may be lower than the priority of the ACK/NACK.

Optionally, the priorities of the N pieces of UCI may be represented in descending order as: ACK/NACK>SR>BFI>RI>WB CQI/PMI>SB CQI/PMI>BSR. A resource used by the terminal device to send the SR is actually configured by the access network device. In other words, regardless of a beam used by the terminal device to send the SR, the access network device merely needs to learn that the terminal device has a requirement for sending uplink data. Therefore, according to the method in this embodiment of this application, in the N pieces of UCI, the priority of the BFI may be lower than the priority of the SR.

Optionally, the priorities of the N pieces of UCI may be represented in descending order as: ACK/NACK>SR>RI>BFI>WB CQI/PMI>SB CQI/PMI>BSR. Once the RI is inaccurately parsed, at least one code word is confusing. In addition, a reporting period of the RI, namely, the sending period in time domain is greater than a preset period threshold. Once the RI fails to be parsed and is discarded, a wait time for next reporting is relatively long. Therefore, according to the method in this embodiment of this application, in the N pieces of UCI, the priority of the BFI may further be lower than the priority of the RI.

Optionally, the priorities of the N pieces of UCI may be represented in descending order as: BFI>SR>ACK/NACK>RI>WB CQI/PMI>SB CQI/PMI>BSR. The SR is a resource scheduling request sent to the access network device when the terminal device has a requirement for sending uplink data. However, the ACK/NACK is a reception feedback of the terminal device for downlink data sent by the access network device, and the requirement for sending the uplink data is more urgent. Therefore, according to the method in this embodiment of this application, in the N pieces of UCI, the priority of the SR may further be higher than the priority of the ACK/NACK, and the priority of the ACK/NACK is higher than the priority of the CSI.

Optionally, the priorities of the N pieces of UCI may be represented in descending order as: BFI>ACK/NACK>SR>RI>BSR>WB CQI/PMI>SB CQI/PMI. The BSR includes an amount of uplink data to be sent by the terminal device, and also has an SR function. If a sending period of the BSR in time domain is greater than a sending period of the CQI in time domain, a wait time for a next sending opportunity of the BSR is longer, and therefore, according to the method in this embodiment of this application, in the N pieces of UCI, the priority of the BSR may be higher than the priority of the WB CQI/PMI.

Optionally, the priorities of the N pieces of UCI may be represented in descending order as: BFI>ACK/NACK>BSR>RI>WB CQI/PMI>SB CQI/PMI. If an SR but no BSR exists in the N pieces of UCI sent by the terminal device in a same time unit, according to the method in this embodiment of this application, in the N pieces of UCI, the priority of the BSR may be higher than the priority of the RI.

Optionally, in the information transmission method provided in this embodiment of this application, before the terminal device sends the M pieces of UCI to the access network device in the time unit based on the priorities of the N pieces of UCI in S202, the terminal device may determine the priories of the N pieces of UCI by using at least one of the following: a subcarrier spacing (SCS) corresponding to a resource carrying the UCI, a time length corresponding to the resource carrying the UCI, and an information type or a service type corresponding to the UCI.

Optionally, before the terminal device sends the M pieces of UCI to the access network device based on the priorities of the N pieces of UCI in S202, the method may further include the following step:

The terminal device determines a priority of UCI based on an SCS, where a larger SCS indicates a higher priority of corresponding UCI; in other words, a smaller SCS indicates a lower priority of corresponding UCI.

For example, N=3, and there are three pieces of UCI in total. A resource carrying a first piece of UCI is a PUCCH, and an SCS of the PUCCH is 15 kHz; a resource carrying a second piece of UCI is a PUCCH, and an SCS of the PUCCH is 30 kHz; and a resource carrying a third piece of UCI is a PUCCH, and an SCS of the PUCCH is 60 kHz. A priority of the third piece of UCI is higher than a priority of the second piece of UCI, and the priority of the second piece of UCI is higher than a priority of the first piece of UCI. In other words, in the three pieces of UCI, the priority of the third piece of UCI is the highest, the priority of the second piece of UCI is the second highest, and the priority of the first piece of UCI is the lowest.

Alternatively:

The terminal device determines a priority of UCI based on a time length, where a shorter time length indicates a higher priority of corresponding UCI; and a longer time length indicates a lower priority of corresponding UCI.

For example, N=3, and there are three pieces of UCI in total. Resources carrying the three pieces of UCI are PUCCHs. A PUCCH carrying a first piece of UCI has one symbol, a PUCCH carrying a second piece of UCI has three symbols, and a PUCCH carrying a third piece of UCI has two symbols. In addition, lengths of all symbols in the three pieces of UCI are the same. A priority of the first piece of UCI is the highest, a priority of the second piece of UCI is the lowest, and a priority of the third piece of UCI is the second highest. In other words, the priority of the first piece of UCI is higher than the priority of the third piece of UCI; and the priority of the third piece of UCI is higher than the priority of the second piece of UCI.

Alternatively:

The terminal device determines a priority of UCI based on an information type or a service type, where a higher priority of an information type or a service type indicates a higher priority of corresponding UCI: in other words, a lower priority of an information type or a service type indicates a lower priority of corresponding UCI.

The service type corresponding to the UCI in this embodiment of this application is a service type of uplink information sent through an uplink channel, such as an eMBB service, an MTC service, and a URLLC service. The UCI information type corresponding to the UCI in this embodiment of this application includes several types of UCI: a BFI, a BSR, an SR, an RI, a WB CQI/PMI, an SB CQI/PMI, and an ACK/NACK.

A priority of at least one piece of UCI in the BFI, the BSR information, and the SR information may be higher than a priority of the RI, the WB CQI/PMI, or the SB CQI/PMI, and lower than a priority of the ACK/NACK. A priority of the information type corresponding to the UCI may be determined in a manner similar to that described above, and details are not described herein again.

A priority of UCI of the URLLC service may be higher than a priority of UCI of the eMBB service, and the priority of UCI of the eMBB service may be higher than a priority of UCI of the mMTC service. For example, if the N pieces of UCI include a first piece of UCI, a second piece of UCI, and a third piece of UCI, where the first piece of UCI is the UCI of the URLLC service, the second piece of UCI is the UCI of the eMBB service, and the third piece of UCI is the UCI of the mMTC service, in the N pieces of UCI, the priority of the first piece of UCI may be higher than the priority of the second piece of UCI, and the priority of the second piece of UCI may be higher than the priority of the third piece of UCI.

To be specific, according to the method in this embodiment of this application, the terminal device may determine a priority of each piece of UCI based on an SCS corresponding to a resource carrying each piece of UCI in the N pieces of UCI; or may determine a priority of each piece of UCI based on a time length corresponding to a resource carrying each piece of UCI; or may determine a priority of each piece of UCI based on a priority of an information type or a service type corresponding to each piece of UCI. The subcarrier spacing in this embodiment is a subcarrier spacing of a resource carrying an uplink channel. The subcarrier spacing may be a subcarrier spacing of a physical layer in frequency domain, such as 3.75 kHz, 7.5 kHz, 15 kHz, 30 kHz, 60 kHz, 120 kHz, 240 kHz, or 480 kHz.

The time length in this embodiment is a time length of a resource carrying an uplink channel, for example, a symbol length, a slot length, and a subframe length. For another example, a time length of a long PUCCH may be 0.5 ms or 1 ms, and a time length of a short PUCCH may be one symbol, two symbols, or the like. For a 15-kHz SCS, a length of one symbol may be 71 us.

The resource carrying UCI may be a time-frequency resource carrying UCI, and the time-frequency resource may be a time-frequency resource on a PUCCH. Resources carrying different pieces of UCI in the N pieces of UCI may correspond to same or different SCSs. Different subcarrier spacings may correspond to different (time domain) symbol lengths. Even if resources carrying a plurality of pieces of UCI in the N pieces of UCI correspond to same SCSs, that is, the symbol lengths are the same, resources carrying different UCI may correspond to different time lengths, because quantities of symbols of the resources carrying different UCI may be different.

Figure 3:
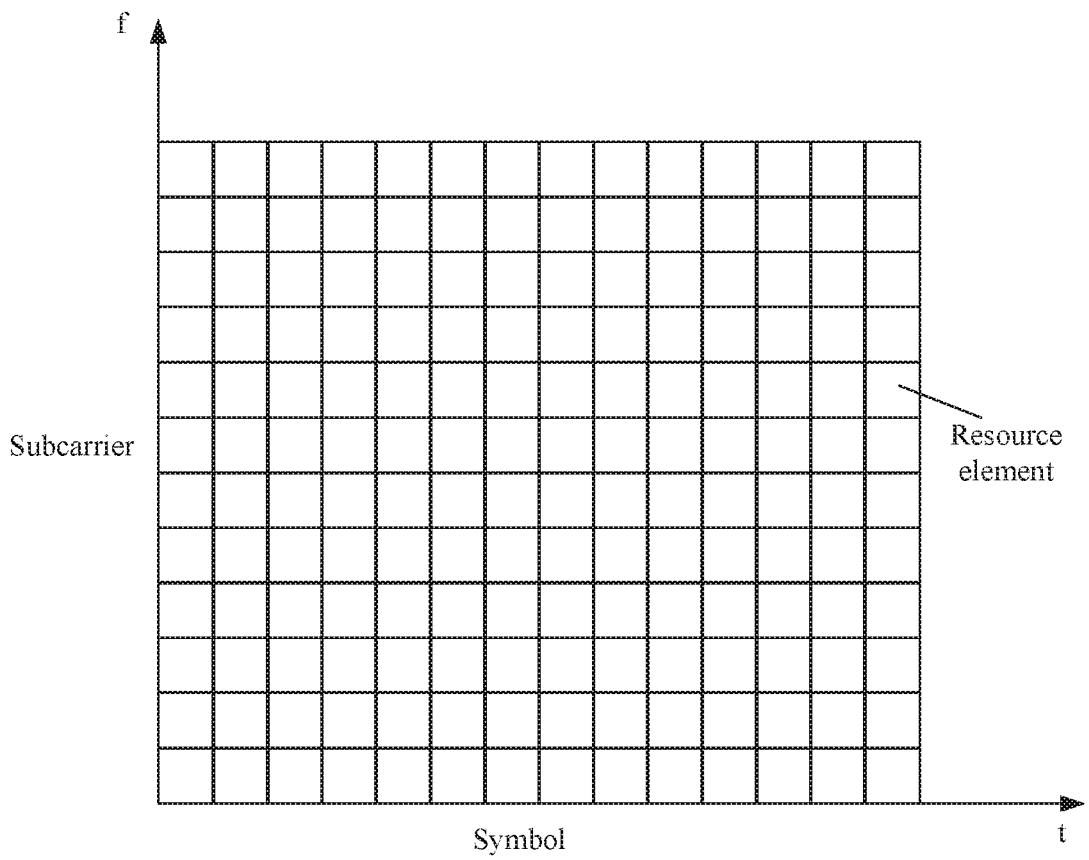
FIG. 3 is a schematic structural diagram of time-frequency resources of a subframe according to an embodiment of this application.

FIG. 3 is a schematic structural diagram of time-frequency resources of a subframe according to an embodiment of this application. Time-frequency resources in a communications system used in this embodiment of this application, for example, a 5G NR system, include a plurality of 10-ms radio frames in time domain. A radio frame includes ten 1-ms subframes, and a subframe has two slots. The time-frequency resources may include a plurality of subcarriers in frequency domain. A granularity for scheduling in frequency domain may be a resource block group (RBG), and the resource block group may include a plurality of resource block (RB) pairs. An RB pair includes: a two-dimensional resource block formed by one subframe in time domain and 12 subcarriers in frequency domain. In FIG. 3, a normal cyclic prefix (NCP) is used as an example. For the NCP, each slot may include seven symbols, and an RB pair may include 168 time-frequency resource elements (RE). For an extended cyclic prefix (ECP) (not shown in FIG. 3), each slot may include six symbols, and an RB pair may include 144 REs.

A resource carrying the UCI may include at least one RB shown in FIG. 3, or may include at least one RE formed by at least one symbol in time domain and at least one subcarrier in frequency domain.

A subcarrier in FIG. 3 may be further referred to as an SCS. In the 5G NR system, a subframe may include a plurality of different SCSs, and different SCSs may correspond to different symbol lengths. In other words, in the time-frequency resources shown in FIG. 3, lengths of the symbols may be different.

The SCS corresponding to the resource carrying the UCI may be a subcarrier spacing of the resource carrying the UCI in frequency domain. The time length corresponding to the resource carrying the UCI may be a length of the resource carrying the UCI in time domain. Table 1 lists a correspondence between an SCS and a symbol length in this embodiment of this application.

TABLE 1

| | F0 | | |
|---|---|---|---|
| | Symbol 0 | Symbol 1 / F1 | Symbol 2 |
| | Symbol 0, Symbol 1 | Symbol 2, Symbol 3 | Symbol 4, Symbol 5 |
| F2 | Symbol 0, Symbol 1, Symbol 2, Symbol 3 | Symbol 4, Symbol 5, Symbol 6, Symbol 7 | Symbol 8, Symbol 9, Symbol 10, Symbol 11 |

| | F0 | |
|---|---|---|
| | Symbol 3 / F1 | Symbol 4 |
| | Symbol 6, Symbol 7 | Symbol 8, Symbol 9 |
| F2 | Symbol 12, Symbol 13, Symbol 14, Symbol 15 | Symbol 16, Symbol 17, Symbol 18, Symbol 19 |

It may be learned from Table 1 that, according to the method in this embodiment of this application, SCSs having different lengths in frequency domain may correspond to different symbol lengths. In other words, different subcarrier spacings may correspond to different symbol lengths. The SCS may be 15 kHz*2n, where n is an integer. The SCS corresponding to the resource carrying the UCI may be any one of eight SCSs: 3.75 kHz, 7.5 kHz, . . . , 480 kHz. The time length corresponding to the resource carrying the UCI may include at least one symbol, and a length of each symbol may be a symbol length determined by using Table 1 based on the SCS corresponding to the resource carrying the UCI. F0, F1, and F2 in Table 1 may respectively correspond to any three different SCSs in the eight SCSs.

If in the N pieces of UCI, one piece of UCI is UCI of a low-delay service such as a URLLC service, a larger SCS corresponding to a resource carrying the piece of UCI indicates a shorter symbol corresponding to the resource carrying the piece of UCI. If in the N pieces of UCI, another piece of UCI is UCI of a delay-insensitive service such as an eMBB service or an mMTC service, a smaller SCS corresponding to a resource carrying the another piece of UCI indicates a longer symbol corresponding to the resource carrying the another piece of UCI Therefore, according to the method in this embodiment of this application, a larger SCS corresponding to the resource carrying the UCI indicates a higher priority of UCI; a smaller SCS corresponding to the resource carrying the UCI indicates a lower priority of UCI. Alternatively, a shorter time length corresponding to the resource carrying the UCI indicates a higher priority of UCI; a longer time length corresponding to the resource carrying the UCI indicates a lower priority of UCI, so that a priority of UCI of the low-delay service is relatively high, a priority of UCI of the delay-insensitive service is relatively low, effectively the access network device receives the UCI of the low-delay service as much as possible, and reliability, a delay requirement, and the like of the low-delay service are effectively ensured.

Optionally, that the terminal device determines the priority of UCI based on the SCS further includes:

if a same SCS is used, determining, by the terminal device, the priority of UCI based on the information type or the service type.

For example, the terminal device first determines the priority of UCI based on the SCS, where N=6 pieces of UCI, in which SCSs of two pieces of UCI are the same and have the highest priority. The terminal device further determines the priority of UCI based on the information type or the service type of the UCI. For example, if an information type of a first piece of UCI is BFI, and an information type of a second piece of UCI is a CQI, the terminal device reports the BFI. A priority of the BFI is higher than a priority of the CQI.

Optionally, that the terminal device determines the priority of UCI based on the SCS further includes:

if a same time length is used, determining, by the terminal device, the priority of UCI based on the information type or the service type.

To be specific, if in the N pieces of UCI, resources carrying a plurality of pieces of UCI correspond to same SCSs or time lengths, according to the method provided in this embodiment of this application, the terminal device may further determine a priority of each piece of UCI based on an information type or a service type corresponding to each piece of UCI in the plurality of pieces of UCI, to accurately sort the N pieces of UCI, and then send the M pieces of UCI with the highest priorities in the N pieces of UCI to the access network device.

Optionally, that the terminal device determines the priority of UCI based on the information type or the service type further includes:

if a same information type or service type is used, determining, by the terminal device, the priority of UCI based on the SCS or the time length.

When there are a plurality of pieces of UCI that have the same information type or service type in the N pieces of UCI, according to the method provided in this embodiment of this application, the terminal device may further determine a priority of each piece of UCI based on an SCS or a time length corresponding to a resource carrying each piece of UCI in the plurality of pieces of UCI that have the same information type, to accurately sort the N pieces of UCI, and then send the M pieces of UCI with the highest priorities in the N pieces of UCI to the access network device.

For example, the terminal device first determines the priority of UCI based on the information type, where N=6× pieces of UCI, in which information types of two pieces of UCI are the same, and are an information type having the highest priority, such as BFI. The terminal device further determines the priority of UCI based on the SCS or the time length of the UCI. For example, a first piece of UCI is carried on a long PUCCH, and a second piece of UCI is carried on a short PUCCH. A priority of the second piece of UCI is higher than a priority of the first piece of UCI, and the terminal device reports the second piece of UCI.

On the access network device side, a priority of UCI is determined by the access network device based on an SCS, and a larger SCS indicates a higher priority of corresponding UCI; or a priority of UCI is determined by the access network device based on a time length, and a shorter time length indicates a higher priority of corresponding UCI; or a priority of UCI is determined by the access network device based on an information type or a service type, and a higher priority of an information type or a service type indicates a higher priority of corresponding UCI.

Optionally, if the priority of UCI is determined by the access network device based on the SCS, and a same SCS is used, the priority of UCI is determined by the access network device based on the information type or the service type.

Optionally, if the priority of UCI is determined by the access network device based on the time length, and a same time length is used, the priority of UCI is determined by the access network device based on the information type or the service type.

Optionally, if the priority of UCI is determined by the access network device based on the information type or the service type, and a same information type or service type is used, the priority of UCI is determined by the access network device based on the SCS or the time length.

Specifically, for specific implementation and beneficial effects of determining the priority of UCI by the access network device based on the SCS, the time length, and the information type or service type, refer to the foregoing descriptions about determining the priority of UCI by the terminal device. Details are not described herein again.

Optionally, that the terminal device sends the M pieces of UCI to the access network device based on the priorities of the N pieces of UCI in S202 may include: sending, by the terminal device, the M pieces of UCI to the access network device through a PUCCH based on the priorities of the N pieces of UCI.

Figure 4:
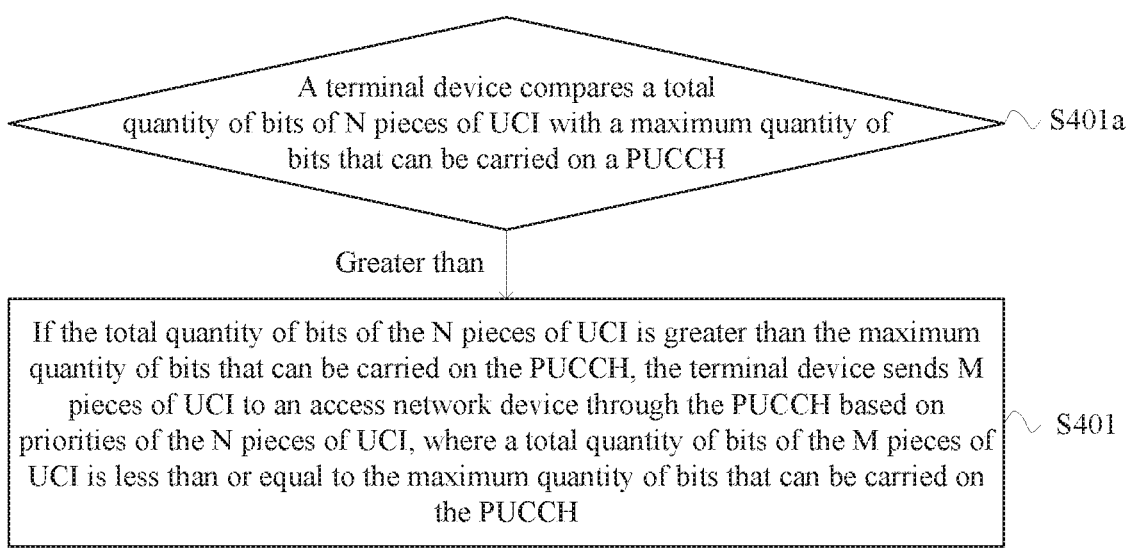
FIG. 4 is a flowchart of another information transmission method according to an embodiment of this application.

FIG. 4 is a flowchart of another information transmission method according to an embodiment of this application. As shown in FIG. 4, in this method, that a terminal device sends M pieces of UCI to an access network device through a PUCCH based on priorities of N pieces of UCI, as shown in the foregoing, includes the following steps.

S401: If a total quantity of bits of the N pieces of UCI is greater than a maximum quantity of bits that can be carried on the PUCCH, the terminal device sends the M pieces of UCI to the access network device through the PUCCH based on the priorities of the N pieces of UCI, where a total quantity of bits of the M pieces of UCI is less than or equal to the maximum quantity of bits that can be carried on the PUCCH.

Optionally, to ensure that the access network device receives, as much as possible, the UCI sent by the terminal device, M may be a maximum quantity of pieces of UCI that can be carried on a PUCCH based on priorities.

To be specific, on the basis of the M pieces of UCI, if a piece of UCI with the highest priority in the remaining N-M pieces of UCI is added, a total quantity of bits of all pieces of UCI with the added piece of UCI is greater than the maximum quantity of bits that can be carried on the PUCCH. In other words, a total quantity of bits of M+1 pieces of UCI is greater than the maximum quantity of bits that can be carried on the PUCCH.

Optionally, in S401, if the total quantity of bits of the N pieces of UCI is greater than the maximum quantity of bits that can be carried on the PUCCH, before the terminal device sends the M pieces of UCI to the access network device through the PUCCH based on the priorities of the N pieces of UCI, the method may further include the following step:

S401a: The terminal device compares the total quantity of bits of the N pieces of UCI with the maximum quantity of bits that can be carried on the PUCCH.

If the total quantity of bits of the N pieces of UCI is greater than the maximum quantity of bits that can be carried on the PUCCH, perform S401: if the total quantity of bits of the N pieces of UCI is less than or equal to the maximum quantity of bits that can be carried on the PUCCH, in the method, the terminal device may send the N pieces of UCI to the access network device.

According to the method in this embodiment of this application, when the total quantity of bits of the N pieces of UCI is greater than the maximum quantity of bits that can be carried on the PUCCH, the M pieces of UCI with the highest priorities in the N pieces of UCI may be sent to the access network device, thereby effectively preventing a conflict in reporting the N pieces of UCI through the PUCCH, ensuring a UCI reporting success rate, and effectively ensuring data transmission performance and service requirements Optionally, after the access network device receives the M pieces of UCI from the terminal device, corresponding to the N-M pieces of UCI, the method may further include:

determining, by the access network device, historical parameters that correspond to the N-M pieces of UCI and that are closest to a current moment.

Specifically, the historical parameters that correspond to the N-M pieces of UCI and that are closest to the current moment may be parameters of the N-M pieces of UCI that are latest reported by the terminal device. After determining the historical parameters that correspond to the N-M pieces of UCI, the access network device may use the historical parameters that correspond to the N-M pieces of UCI to perform operations corresponding to the N-M pieces of UCI.

After receiving the M pieces of UCI from the terminal device, the access network device further determines the historical parameters that correspond to the N-M pieces of UCI and that are closest to the current time, and then uses the historical parameters that correspond to the N-M pieces of UCI, to prevent a UCI reporting conflict, and improve a UC reporting success rate, and further effectively ensure service requirements when the access network device receives less UCI. The historical parameters that correspond to the N-M pieces of UCI and that are closest to the current time are used, to ensure the service requirements of the terminal device.

Figure 5:
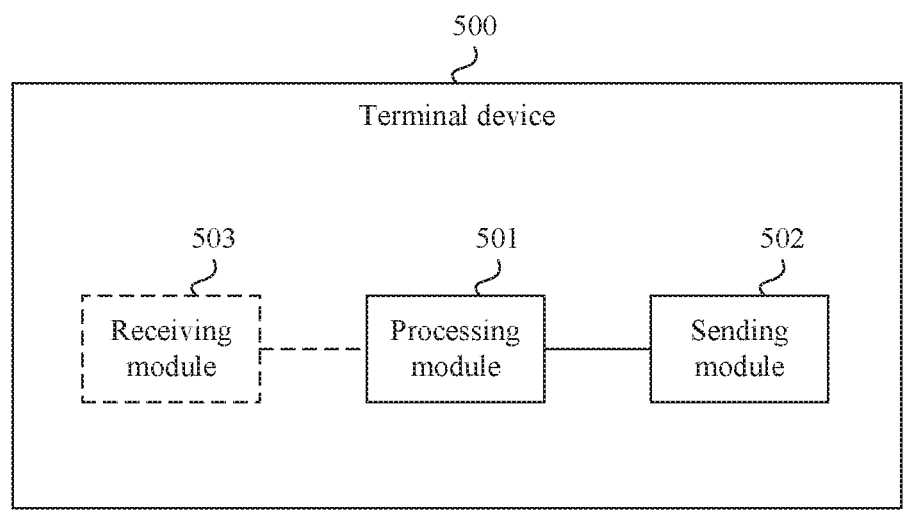
FIG. 5 is a schematic structural diagram of a terminal device according to this application.

An embodiment of this application may further provide a terminal device. The terminal device may perform any information transmission method performed by the terminal device in FIG. 2 or FIG. 4. FIG. 5 is a schematic structural diagram of a terminal device according to this application. As shown in FIG. 5, the terminal device 500 may include: a processing module 501, configured to determine N pieces of uplink control information UCI that need to be sent in a same time unit, where N is an integer greater than or equal to 2, and the N pieces of UCI include at least one of the following: beamforming information, buffer status report information, and scheduling request information; and a sending module 502, configured to send M pieces of UCI to an access network device based on priorities of the N pieces of UCI, where priorities of the M pieces of UCI are higher than priorities of other N-M pieces of UCI in the N pieces of UCI, and M is a positive integer less than or equal to N.

Optionally, the terminal device 500 may further include:
a receiving module 503, configured to receive indication information from the access network device; where the processing module 501 is further configured to determine, based on the indication information, the N pieces of UCI that need to be sent in a same time unit.

Optionally, the N pieces of UCI further include CSI, and a priority of at least one piece of UCI in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and both T and P are positive integers.

Optionally, the N pieces of UCI further include an ACK/NACK, and the priority of the at least one piece of UC in the beamforming information, the buffer status report information, and the scheduling request information is lower than a priority of the ACK/NACK.

Optionally, the processing module 501 is further configured to determine a priority of UCI based on an SCS, where a larger SCS indicates a higher priority of corresponding UCI; or determine a priority of UCI based on a time length, where a shorter time length indicates a higher priority of corresponding UCI; or determine a priority of UCI based on an information type or a service type, where a higher priority of an information type or a service type indicates a higher priority of corresponding UCI.

Optionally, the processing module 501 is further configured to determine the priority of UCI based on the SCS, and if a same SCS is used, determine the priority of UCI based on the information type or the service type.

Optionally, the processing module 501 is further configured to determine the priority of UCI based on the time length, and if a same time length is used, determine the priority of UCI based on the information type or the service type.

Optionally, the processing module 501 is further configured to determine the priority of UCI based on the information type or the service type, and if a same information type or service type is used, determine the priority of UCI based on the SCS or the time length.

Optionally, the sending module 502 is further configured to send the M pieces of UCI to the access network device through a PUCCH based on the priorities of the N pieces of UCI.

Optionally, the sending module 502 is further configured to: if a total quantity of bits of the N pieces of UCI is greater than a maximum quantity of bits that can be carried on the PUCCH, send the M pieces of UCI to the access network device through the PUCCH based on the priorities of the N pieces of UCI, where a total quantity of bits of the M pieces of UCI is less than or equal to the maximum quantity of bits that can be carried on the PUCCH.

Figure 6:
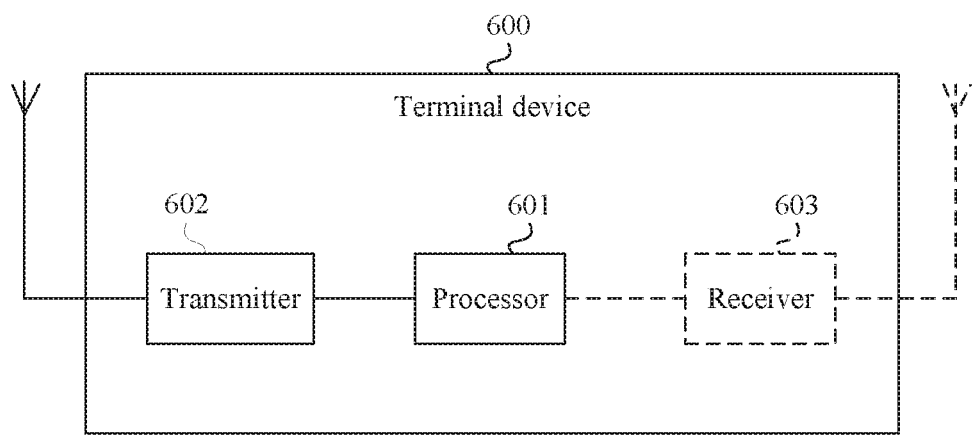
FIG. 6 is a schematic structural diagram of another terminal device according to an embodiment of this application.

Optionally, an embodiment of this application may further provide a terminal device. FIG. 6 is a schematic structural diagram of another terminal device according to this embodiment of this application. As shown in FIG. 6, the terminal device 600 may include: a processor 601, a transmitter 602, and a receiver 603. The processor 601 may be connected to the transmitter 602. The processor 601 may be further connected to the receiver 603.

The processing module 501 shown in the foregoing may be implemented by the processor 601 invoking a program instruction stored in a memory. The sending module 502 shown in the foregoing may be implemented by the processor 601 controlling the transmitter 602. The receiving module 503 may be implemented by the processor 601 by controlling the receiver 603.

Figure 7:
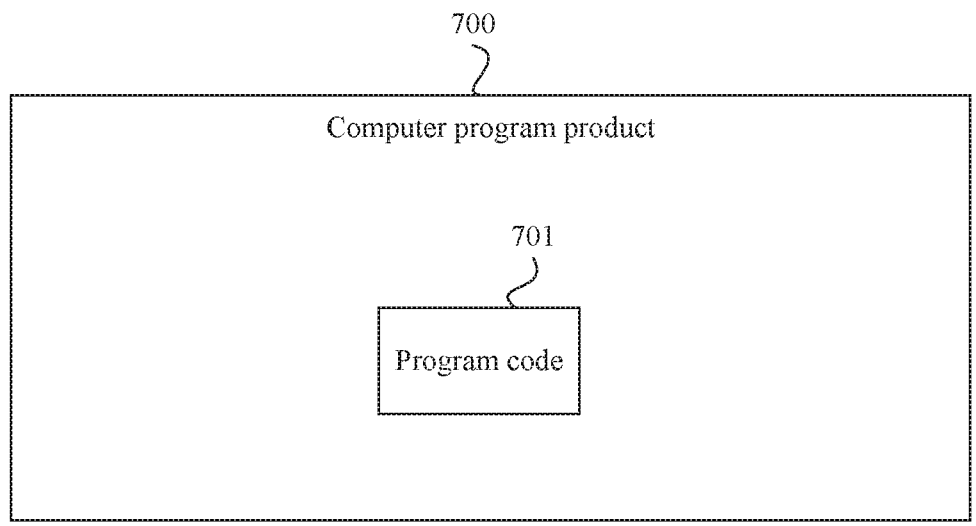
FIG. 7 is a schematic structural diagram of a computer program product according to an embodiment of this application.

Optionally, an embodiment of this application further provides a computer program product. FIG. 7 is a schematic structural diagram of a computer program product according to this embodiment of this application. As shown in FIG. 7, the computer program product 700 may include program code 701.

The program code 701 may be corresponding program code used to perform any information transmission method performed by the terminal device in FIG. 2 or FIG. 4 in the embodiments of this application. The program code 701 in the computer program product 700 may be performed, for example, by the processor 601 in the terminal device 600 shown in FIG. 6.

Figure 8:
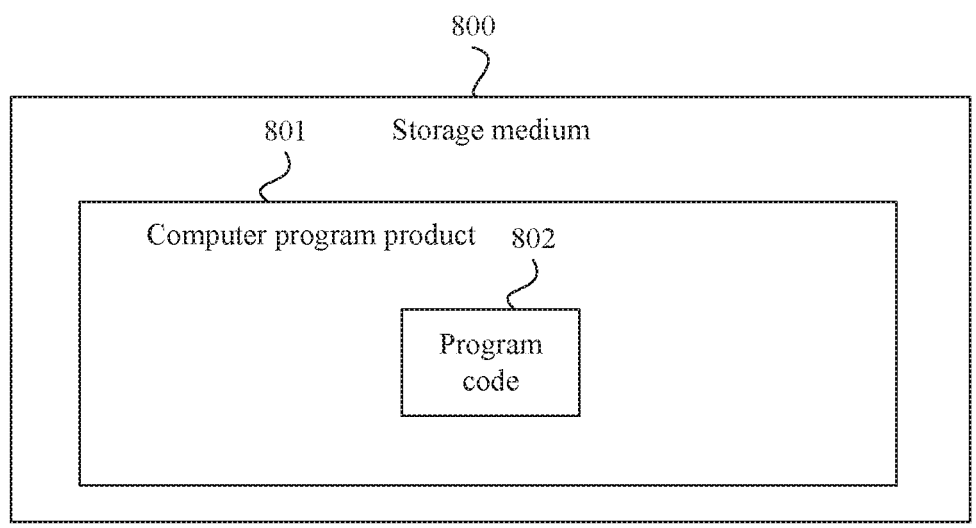
FIG. 8 is a schematic structural diagram of a storage medium according to an embodiment of this application.

Optionally, an embodiment of this application further provides a storage medium. FIG. 8 is a schematic structural diagram of a storage medium according to this embodiment of this application. As shown in FIG. 8, the storage medium 800 may be configured to store a computer program product 801. The computer program product 801 may include program code 802.

The program code 802 may be corresponding program code used to perform any information transmission method performed by the terminal device in FIG. 2 or FIG. 4 in the embodiments of this application.

The storage medium 800 may be an internal memory in the terminal device 600 shown in FIG. 6, or may be an external storage connected to the terminal device 600 shown in FIG. 6. The program code 802 in the computer program product 801 may be performed, for example, by the processor 601 in the terminal device 600 shown in FIG. 6.

The terminal device, the computer program product, and the storage medium provided in the embodiments of this application may perform any information transmission method performed by the terminal device in FIG. 2 or FIG. 4. For specific implementation and beneficial effects of the terminal device, the computer program product, and the storage medium, refer to the foregoing description. Details are not described herein again.

Figure 9:
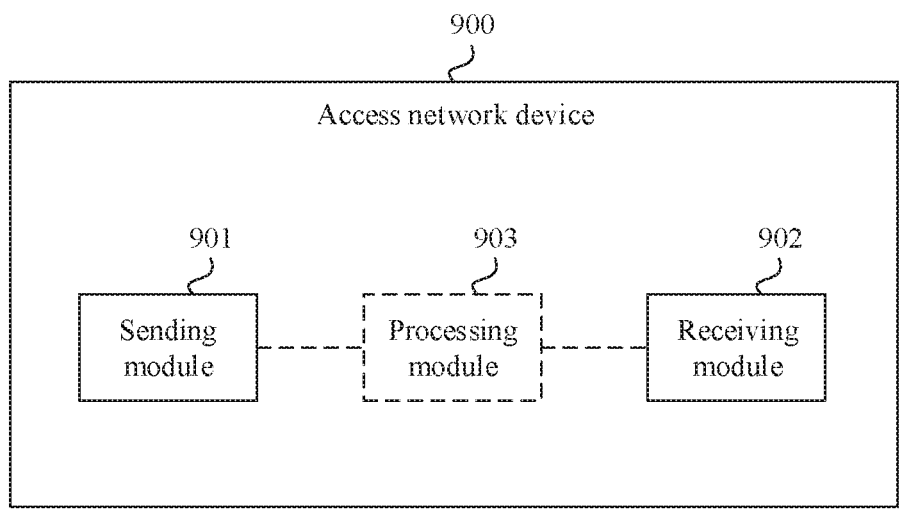
FIG. 9 is a schematic structural diagram of an access network device according to an embodiment of this application.

An embodiment of this application further provides an access network device. The access network device may perform any information transmission method performed by the access network device in FIG. 2 or FIG. 4. FIG. 9 is a schematic structural diagram of an access network device according to this embodiment of this application. As shown in FIG. 9, the access network device 900 may include:

a sending module 901, configured to send indication information to a terminal device, where the indication information is used to indicate time unit information of N pieces of UCI to the terminal device, the time unit information is used to determine the N pieces of UCI that need to be carried in a time unit, N is an integer greater than or equal to 2, and the N pieces of UCI include at least one of the following: beamforming information, buffer status report information, and scheduling request information; and a receiving module 902, configured to receive M pieces of UCI from the terminal device, where priorities of the M pieces of UCI are higher than priorities of other N-M pieces of UCI in the N pieces of UCI, and M is a positive integer less than or equal to N.

Optionally, the N pieces of UCI further include CSI, and a priority of at least one piece of UCI in the beamforming information, the buffer status report information, and the scheduling request information is higher than a priority of the CSI.

Optionally, a sending period of the beamforming information in time domain is T preset time lengths, and a sending period of the CSI in time domain is P preset time lengths, where T≥P, and T and P are positive integers.

Optionally, the N pieces of UCI further include an ACK NACK, and the priority of the at least one piece of UCI in the beamforming information, the buffer status report information, and the scheduling request information is lower than a priority of the ACK/NACK.

Optionally, a priority of UCI is determined by the access network device based on an SCS, and a larger SCS indicates a higher priority of corresponding UCI; or a priority of UCI is determined by the access network device based on a time length, and a shorter time length indicates a higher priority of corresponding UCI; or a priority of UCI is determined by the access network device based on an information type or a service type, and a higher priority of an information type or a service type indicates a higher priority of corresponding UCI.

Optionally, if the priority of UCI is determined by the access network device based on the SCS, and a same SCS is used, the priority of UCI is determined by the access network device based on the information type or the service type.

Optionally, if the priority of UCI is determined by the access network device based on the time length, and a same time length is used, the priority of UCI is determined by the access network device based on the information type or the service type.

Optionally, if the priority of UCI is determined by the access network device based on the information type or the service type, and a same information type or service type is used, the priority of UCI is determined by the access network device based on the SCS or the time length.

Optionally, the receiving module 902 is further configured to receive the M pieces of UCI through a PUCCH.

Optionally, the receiving module 902 is further configured to receive, through the PUCCH, the M pieces of UCI that are sent by the terminal device when a total quantity of bits of the N pieces of UCI is greater than a maximum quantity of bits that can be carried on the PUCCH, where a total quantity of bits of the M pieces of UCI is less than or equal to the maximum quantity of bits that can be carried on the PUCCH.

Optionally, the access network device 900 further includes:

a processing module 903, configured to determine historical parameters that correspond to the N-M pieces of UCI and that are closest to a current time.

Figure 10:
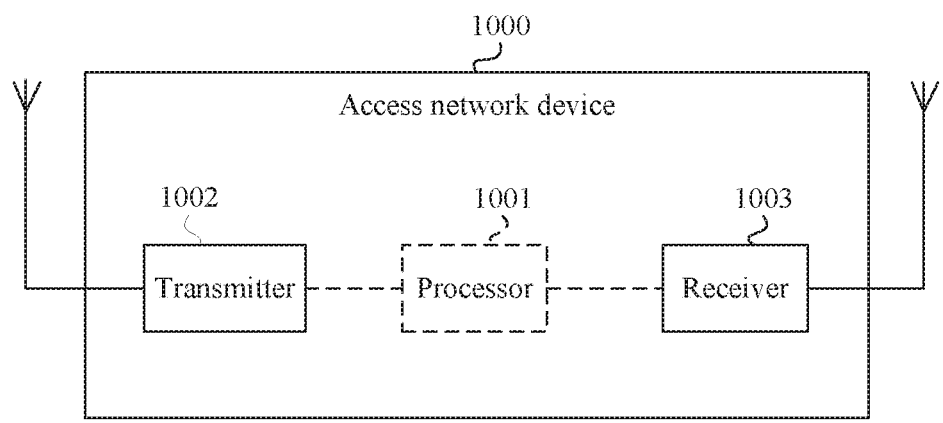
FIG. 10 is a schematic structural diagram of another access network device according to an embodiment of this application.

Optionally, an embodiment of this application may further provide an access network device. FIG. 10 is a schematic structural diagram of another access network device according to this embodiment of this application. As shown in FIG. 10, the access network device 1000 may include: a processor 1001, a transmitter 1002, and a receiver 1003. The processor 1001 is separately connected to the transmitter 1002 and the receiver 1003.

The sending module 901 shown in the foregoing may be implemented by the processor 1001 invoking a program instruction stored in a memory to control the transmitter 1002. The receiving module 902 shown in the foregoing may be implemented by the processor 1001 by invoking a program instruction stored in the memory to control the receiver 1003. The processing module 903 shown in the foregoing may be implemented by the processor 1001 by invoking the program instruction stored in the memory.

Figure 11:
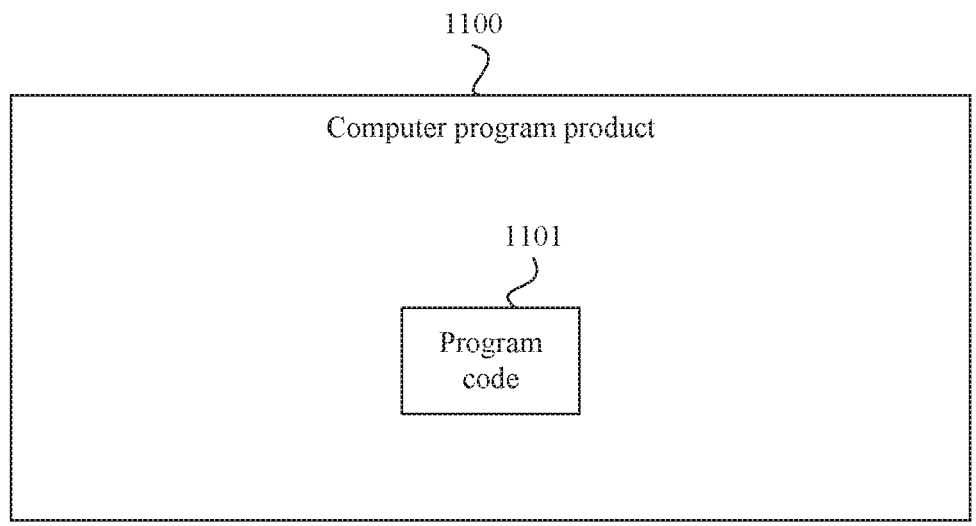
FIG. 11 is a schematic structural diagram of another computer program product according to an embodiment of this application.

Optionally, an embodiment of this application further provides a computer program product. FIG. 1 is a schematic structural diagram of another computer program product according to this embodiment of this application. As shown in FIG. 11, the computer program product 1100 may include program code 1101.

The program code 1101 may be corresponding program code used to perform any information transmission method performed by the access network device in FIG. 2 or FIG. 4 in the embodiments of this application. The program code 1101 in the computer program product 1100 may be performed, for example, by the processor 1001 in the access network device 1000 shown in FIG. 10.

Figure 12:
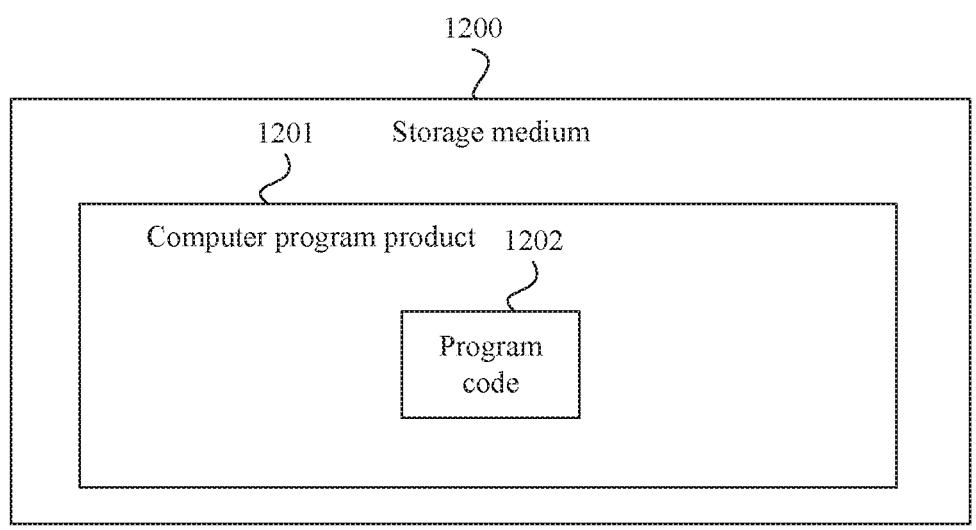
FIG. 12 is a schematic structural diagram of another storage medium according to an embodiment of this application.

Optionally, an embodiment of this application further provides a storage medium. FIG. 12 is a schematic structural diagram of another storage medium according to this embodiment of this application. As shown in FIG. 12, the storage medium 1200 may be configured to store a computer program product 1201. The computer program product 1201 may include program code 1202.

The program code 1202 may be corresponding program code used to perform any information transmission method performed by the access network device in FIG. 2 or FIG. 4 in the embodiments of this application.

The storage medium 1200 may be an internal memory in the access network device 1000 shown in FIG. 10, or may be an external storage connected to the access network device 1000 shown in FIG. 10. The program code 1202 in the computer program product 1201 may be performed, for example, by the processor 1001 in the access network device 1000 shown in FIG. 10.

The access network device, the computer program product, and the storage medium provided in the embodiments of this application may perform any information transmission method performed by the access network device in FIG. 2 or FIG. 4. For specific implementation and beneficial effects of the access network device, the computer program product, and the storage medium, refer to the foregoing description. Details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for information receiving performed by an access network device, comprising:
configuring, by the access network device, resources for N pieces of uplink control information (UCI), wherein the resources partly overlap or completely overlap in time domain, wherein:
the N pieces of UCI at least comprise beam channel quality information and channel state information other than the beam channel quality information, wherein a priority of the beam channel quality information is higher than a priority of the channel state information, and a priority of M pieces of UCI in the N pieces of UCI is higher than a priority of other N-M pieces of UCI in the N pieces of UCI, the M pieces of UCI at least comprise the beam channel quality information, the N-M pieces of UCI do not comprise the beam channel quality information, wherein N is an integer greater than or equal to 2, M is a positive integer less than or equal to N, and wherein the beam channel quality information is channel quality indicator of a beam configured for a terminal device; and receiving, by the access network device, the M pieces of UCI from the terminal device.

2. The method according to claim 1, wherein the channel state information comprises at least one of the following: a rank indicator (RI), a precoding matrix indicator (PMI), a channel quality indicator (CQI), or a precoding type indicator (PTI).

3. The method according to claim 1, wherein the method further comprises:

sending, by the access network device, indication information to the terminal device, wherein the indication information indicates time unit information of the resources for the N pieces of UCI.

4. An apparatus for information receiving, the apparatus is an access network device, and the access network device comprising:

one or more processors, and a non-transitory storage medium in communication with the one or more processors, wherein the non-transitory storage medium is configured to store program instructions, and wherein, when executed by the one or more processors, the program instructions cause the apparatus to perform:

configuring resources for N pieces of uplink control information (UCI), wherein the resources partly overlap or completely overlap in time domain, wherein:

the N pieces of UCI at least comprise beam channel quality information and channel state information other than the beam channel quality information, wherein a priority of the beam channel quality information is higher than a priority of the channel state information, and a priority of M pieces of UCI in the N pieces of UCI is higher than a priority of other N-M pieces of UCI in the N pieces of UCI, the M pieces of UCI at least comprise the beam channel quality information, the N-M pieces of UCI do not comprise the beam channel quality information, wherein N is an integer greater than or equal to 2, M is a positive integer less than or equal to N, and wherein the beam channel quality information is channel quality indicator of a beam configured for a terminal device; and receiving the M pieces of UCI from the terminal device.

5. The apparatus according to claim 4, wherein the channel state information comprises at least one of the following: a rank indicator (RI), a precoding matrix indicator (PMI), a channel quality indicator (CQI), or a precoding type indicator (PTI).

6. The apparatus according to claim 4, wherein the program instructions further cause the apparatus to perform:

sending indication information to the terminal device, wherein the indication information indicates time unit information of the resources for the N pieces of UCI.

7. The method according to claim 1, wherein the receiving, by the access network device, the M pieces of UCI from the terminal device comprises:

receiving, by the access network device, the M pieces of UCI from the terminal device through physical uplink control channel (PUCCH).

8. The apparatus according to claim 4, wherein the receiving the M pieces of UCI from the terminal device comprises:

receiving the M pieces of UCI from the terminal device through physical uplink control channel (PUCCH).

9. A method for information transmission performed by a terminal device, comprising:

determining, by the terminal device, resources for carrying N pieces of uplink control information (UCI), wherein the resources partly overlap or completely overlap in time domain, wherein:

the N pieces of UCI at least comprise beam channel quality information and channel state information other than the beam channel quality information, wherein a priority of the beam channel quality information is higher than a priority of the channel state information, and a priority of M pieces of UCI in the N pieces of UCI is higher than a priority of other N-M pieces of UCI in the N pieces of UCI, the M pieces of UCI at least comprise the beam channel quality information, the N-M pieces of UCI do not comprise the beam channel quality information, wherein the beam channel quality information is a channel quality indicator of a beam selected by the terminal device, N is an integer greater than or equal to 2, M is a positive integer less than or equal to N; and sending, by the terminal device, the M pieces of UCI to a network device.

10. The method according to claim 9, wherein the channel state information comprises at least one of the following: a rank indicator (RI), a precoding matrix indicator (PMI), a channel quality indicator (CQI), or a precoding type indicator (PTI).

11. The method according to claim 9, wherein the sending, by the terminal device, the M pieces of UCI to a network device comprises:

sending the M pieces of UCI to the network device through physical uplink control channel (PUCCH).

12. The method according to claim 9, wherein the method further comprises:

receiving, by the terminal device, indication information from a network device, wherein the indication information is used to indicate time unit information of the N pieces of UCI to the terminal device, the time unit information is used to determine the resources for carrying the N pieces of UCI.

13. An apparatus for information transmission, the apparatus is a terminal device, and the terminal device comprising:

one or more processors, and a non-transitory storage medium in communication with the one or more processors, wherein the non-transitory storage medium is configured to store program instructions, and wherein, when executed by the one or more processors, the program instructions cause the apparatus to perform:

determining resources for carrying N pieces of uplink control information (UCI), wherein the resources partly overlap or completely overlap in time domain, wherein:

the N pieces of UCI at least comprise beam channel quality information and channel state information other than the beam channel quality information, wherein a priority of the beam channel quality information is higher than a priority of the channel state information, and a priority of M pieces of UCI in the N pieces of UCI is higher than a priority of other N-M pieces of UCI in the N pieces of UCI, the M pieces of UCI at least comprise the beam channel quality information, the N-M pieces of UCI do not comprise the beam channel quality information, wherein the beam channel quality information is a channel quality indicator of a beam selected by the apparatus, N is an integer greater than or equal to 2, M is a positive integer less than or equal to N; and sending the M pieces of UCI to a network device.

14. The apparatus according to claim 13, wherein the channel state information comprises at least one of the following: a rank indicator (RI), a precoding matrix indicator (PMI), a channel quality indicator (CQI), or a precoding type indicator (PTI).

15. The apparatus according to claim 13, wherein the sending the M pieces of UCI to a network device comprises:
sending the M pieces of UCI to the network device through physical uplink control channel (PUCCH).

16. The apparatus according to claim 13, wherein the program instructions further cause the apparatus to perform:
receiving indication information from a network device, wherein the indication information is used to indicate time unit information of the N pieces of UCI to the apparatus, the time unit information is used to determine the resources for carrying the N pieces of UCI.

* * * * *